United States Patent [19]
Murphy

[11] Patent Number: 6,033,757
[45] Date of Patent: Mar. 7, 2000

[54] CONTINUOUS POLYMER AND FABRIC COMPOSITE

[76] Inventor: Donald J. Murphy, 3314 Bellmeade Dr., Valdosta, Ga. 31605

[21] Appl. No.: 09/062,782

[22] Filed: Apr. 16, 1998

Related U.S. Application Data

[63] Continuation-in-part of application No. 08/828,842, Mar. 24, 1997, abandoned.

[51] Int. Cl.$^7$ ........................................................ B32B 3/24
[52] U.S. Cl. .......................... 428/138; 428/137; 428/516; 428/520; 428/131; 404/83; 442/398; 442/396; 442/394
[58] Field of Search ..................................... 428/137, 516, 428/520, 131, 138; 442/398, 396, 394; 404/83

[56] References Cited

U.S. PATENT DOCUMENTS

| | | | |
|---|---|---|---|
| 4,485,137 | 11/1984 | White | 428/57 |
| 4,898,761 | 2/1990 | Dunawaq et al. | 428/137 |
| 5,507,900 | 4/1996 | Mohammed et al. | 156/157 |
| 5,843,554 | 12/1998 | Katz | 428/68 |

*Primary Examiner*—William P. Watkins, III
*Attorney, Agent, or Firm*—Arthur G. Yeager

[57] ABSTRACT

The present invention is a wet cure concrete cover which is designed and configured to retain moisture during the process of curing concrete. The blanket is a multi-layered structure having a base layer, for contacting the cement, and a film layer is extrusion coated to the base layer for protecting the base layer. The base layer is a non-woven, hydrophobic material that will allow the water to adhere to its fibers. In one embodiment a film layer, preferably polypropylene, is extruded onto the base layer. In a second embodiment a low-density polymerize resin is secured to the base layer via a tie layer. Alternatively, under conditions of high temperature and lower humidity, the film layer of the first and second embodiments can include a plurality of perforations, allowing for periodic water spraying or rewetting of the curing cover.

16 Claims, No Drawings

CONTINUOUS POLYMER AND FABRIC COMPOSITE

This is a Continuation-In-Part of application Ser. No. 08/828,842 filed Mar. 24, 1997 ABN.

BACKGROUND OF THE INVENTION

1. Field of the Invention

The present invention relates generally to a polymer and fabric composite, and more particularly, to a continuous extrusion laminated composite which is specifically used for the curing of concrete.

2. Description of the Prior Art

For properly curing concrete, it is recommended by the American Concrete Institute to maintain a satisfactory moisture content. Maintaining moisture during the curing stage will inherently increase the strength and durability of the final product. Failure to retain an adequate amount of moisture during the curing stage of concrete may result in cracking, dusting, scaling and crazing. Conventionally, water will periodically be applied to the concrete during the curing stage. This process of spraying water is time consuming and labor intensive. Additionally, spraying does not guarantee an even distribution of moisture necessary for proper curing.

Accordingly, efforts have been made to improve the curing process of concrete by providing a product which will allow an adequate amount of moisture to be retained during the curing stage. One such product is disclosed in U.S. Pat. No. 4,485,137 issued to White. White discloses a curing blanket which is designed to cover and protect concrete during curing. This blanket comprises a surface layer made from a water-impervious, low-density thermoplastic and a batting layer made from a non-woven material. According to the patent, the melt coating of the surface layer onto the batting layer provides a permanent attachment. This will provide for the surface layer to penetrate into the batting layer and cause a mechanical attachment. Unfortunately, due to this method of adhering the layers, the mechanical properties of both the fabric and coating are drastically sacrificed since the strength of each layer will inherently and substantially be reduced. Additionally, it is even questionable as to the permanence of the securement of the two layers since it is well known that a polypropylene polymer, which is used as the batting layer, and a low-density polyethylene, used as the impervious low-density thermoplastic, are considered incompatible and will produce a poor chemical bond and a deficient mechanical bond which can result in a separation of the composite layers. In summary, adhesion of the two layers may not be one hundred percent and the structural integrity of each layer is questionable. Further still, the penetration of the low-density polyethylene into the polypropylene resin will cause a decrease in retentionable surface area, thereby reducing the amount of moisture which can be retained within the batting layer.

Yet another continuous polymer and fabric composite disclosed in U.S. Pat. No. 5,507,900 issued to Mohammed et al. In this patent there is disclosed a laminated polymer and fabric sheet which is ideally used in environmental, mining, and other projects relating to outdoor terrain. As such, each layer of this continuous polymer and fabric must be of a sufficient thickness for enabling proper use. This thickness which is disclosed is used for the environments identified above, but due to its specified thickness, this composite cannot be successfully used for a wet cure cover or summer curing blanket. In addition the method lamination, as disclosed in Mohammed et al. limits its structural strength as well as its intended length and width that can be formed. That is why Mohammed discloses a lip for allowing lap seaming to take place, so the consumer can have the desired width or length.

Accordingly, it is seen that there exists a need to provide for a wet cure cover or summer curing blanket that will sufficiently and successfully enable proper curing of concrete without requiring repeated rewetting of particular area. The previous efforts, such as the one defined above, do not provide the benefits intended with the present invention, such as providing a reusable wet curing cover which will adequately obtain a desirable moisture retention of the concrete during the curing process. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY OF THE INVENTION

The present invention provides a composite which can successfully be used as a wet cure concrete cover to retain moisture during the curing process of concrete. The composite comprises two embodiments and the method thereof, to provide for an adequate and efficient cover which is designed and configured to be reusable.

The first embodiment is a multi-layer composite comprising a base layer and a protective layer extruded thereto. The base layer is designed to contact the concrete and, as such, is a non-woven fabric that possesses the ability to retain moisture for enabling the concrete to remain wet during the curing process. This base layer is preferably fabricated from a fibrous material possessing adsorption characteristics for enabling the liquid, such as water, to adhere to and be retained between the mass of entangled fibers and not absorb into the fibers. In this configuration, the hydrophobic material will allow the water to adhere to the fibers to provide for the surface of the concrete to remain moist and wet, consequently rendering proper curing of the concrete.

The protective layer or top layer is attached to the base layer. This protective layer will provide adequate protection to the base layer to prohibit excess evaporation of the moisture retained therein. For that reason, this protective layer will be a moisture, vapor resistant barrier to the fabric and will reduce the porosity of the fabric to air flow and resultant evaporation.

For enhancing the product, additives and the like can be added to the protective layer. As an example, for protection from the sun, and in essence, reducing and eliminating the possibility of moisture removal from the base, an ultraviolet inhibitor can be applied to the protective layer. Yet another example would be to include a white color pigment to the protective layer which will render a top layer that can adequately and efficiently reflect light and heat from the curing cover.

To enable proper securement to the base and to adequate prevent an excess of moisture from evaporating from the base, a material possessing excellent co-extrusion properties and excellent heat seal and adhesion characteristics is desirable. One such material which has been used to produce superior results is preferably polypropylene. The use of polypropylene produces a final product with exceptional strength properties, especially when compared to a low density poly coating.

For the second embodiment, wherein it is desirous to use a low-density protective layer, a tie layer or adhesion layer is utilized for correctly bonding the protective layer to the base layer. In this embodiment, the tie layer will permit common protective layer material, such as low-density polyethylene, to adhere firmly to a typical base, such as propylene based polymer. The tie layer will guarantee a satisfactory adhesion without sacrificing the structural integrity or properties of the protective layer or base.

The above-described embodiments can be altered by providing the protective layer of each embodiment to be micro-perforated. This alteration is ideal for areas of high temperature and low humidity. Such perforations will eliminate the need of rewetting the blanket and restoring moisture.

The final product is an excellent wet cure cover or summer curing blanket. The blanket can be of any size or shape and is configured to easily roll or wrap. This flexibility permits for an adequate means of transporting the final product as well as provide for a blanket which can be wrapped and secured around odd shaped items, such as columns, or the like.

Accordingly, it is the object of the present invention to provide for a composite which can be used as a wet cure cover or a summer curing blanket for enabling the retention of moisture in a highly retentive saturated fabric and allowing for gradual, uniform and controlled curing of the surface for increased pour strength and hardness test values for bridges, docks, highways, viaducts, spillways, building construction, military installations, and the like.

It is another object of the present invention to provide a composite which can be used as a wet cure cover or summer curing blanket which is chemically inert and will not rot, decay nor mildew.

Still a further object of the present invention is to provide a composite which can be used as a wet cure cover or summer curing blanket that includes a means to guard against sunlight degradation.

Yet another object of the present invention is to provide a composite which can be used as a wet cure cover or summer curing blanket which is durable and reusable.

A further object of the present invention is to provide a composite which can be used as a wet cure cover or summer curing blanket which is a highly flexible compound that has the capabilities to lie flat and co-planar to any surface.

Another object of the present invention is to provide for a composite which can be used as a wet cure cover or summer curing blanket and which will overcome the deficiencies, shortcomings, and drawbacks of prior concrete curing blankets or concrete curing processes.

Still another object of the present invention, to be specifically enumerated herein, is to provide a composite which can be used as a wet cure cover or summer curing blanket in accordance with the preceding objects and which will conform to conventional forms of manufacture, be of simple construction and easy to use so as to provide a device that would be economically feasible, long lasting and relatively trouble free in operation.

Although there have been some inventions related to a concrete curing blanket, none of the inventions have become sufficiently compact, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Thus, a fuller understanding of the invention may be had by referring to the detailed description of the preferred embodiments in addition to the scope of the invention defined by the claim.

DESCRIPTION OF THE PREFERRED EMBODIMENTS

The present invention provides for a continuous composite which will adequately enable proper curing of concrete by allowing moisture to be retained within the concrete during a specified period of time. Therefore, this product of the present invention is a composite which can be used as a wet cure concrete cover.

The composite of the present invention comprises a base layer and a protective layer. When the final product is assembled and utilized, the base layer will be applied to the conventional "wet" concrete to allow the base layer to contact and cover this concrete. For maintaining the proper moisture retention for optimum curing of the concrete, the base layer is fabricated from a fibrous, non-woven material which exhibits hydrophobic properties. This will provide for the moisture, such as water, to adhere to and be retained between the mass of the filaments of the entangled material. The purpose of this base layer is to retain fluid so as to enable the concrete to remain in the wet stage for an extended period of time. This prolonged wetness, during curing, will primarily strengthen the cured product. Any material possessing hydrophobic properties can be used as the base. Materials which have been used to produce excellent results have been, but are not limited to, propylene based polymers, preferably, polypropylene.

In the first embodiment, the protective is extrusion coated to the top surface of the base layer. The intent of the protective layer is to provide a moisture barrier to the fabric or base layer. This protective layer will also lessen the porosity of the fabric and decrease air flow therethrough for inherently reducing, if not eliminating, the evaporation of moisture from the base. Accordingly, the protective layer must permanently bond to the base so that the mechanical properties of each layer is not sacrificed. Additionally, at some point, this wet cure concrete cover will be exposed to the sun, and as such the cover must include a means for guarding against sunlight degradation.

The most efficient means available is to provide the protective layer with conventional ultraviolet inhibitors. Thereby, the protective layer must be adapted to accept other components and elements, such as ultraviolet inhibitors, white pigmentation, or the like, for enhancing the finale product. One such protective layer which has been used to produce excellent results is a high-density thermoplastic, such as high-density polymerized resin, preferably polypropylene. This final product is an advantageous product that will offer the consumer a plurality of benefits, such as, but not limited to, providing a cover which is a vapor retarder, providing a cover with exceptional high tensile strength, and a cover with high puncture strength. All features desirable in a wet cure concrete cover.

For properly alloying the protective layer to the fabric, an extrusion process is utilized. In this process, the protective layer is extrusion coated to the top surface of the base layer for implementing a thermal bond between the two layers. This thermal bonding provides proper melt strength without breaking the covalent bonds or physical structure of each layer, thereby the structural integrity of the layers is not sacrificed.

In this first embodiment, the final product will be a highly flexible compound or composite which can be used as a wet cure cover or a summer curing blanket having any shape or size. Optionally, the composite can be shaped into multi-width membranes for easing the installation, manufacturing, and shipping of the final product. These sizes can be typical to the art, and thus, the membranes can have standard roll sizes, such as, but not limited to widths of 3⅓ feet, 5⅔ feet, 5 feet, 10 feet, 15 feet, 20 feet, and 40 feet, and having lengths of 100 feet and 200 feet. As a result, utilization of the composite can be accomplished by obvious methods of combining the multi-width membranes, for example, lap seaming or side adhering.

The thickness of the base is in the range of approximately 45–60 mil, preferably 50 mil, while the thickness of the protective layer is approximately 2–5 mil, preferably 4 mil in thickness. Thickness of 50 mil for the base and 4 mil for the protective layer have been used to produce favorable results.

Since the protective layer is extrusion coated to the base, pressure is applied to essentially enable proper thermal bonding between the two layers. This will result in a slight compression or loss of the thickness of the composite. The loss will cause the final product to be approximately 50 mil in total thickness and will exhibit excellent moisture retention. Additionally, this composite will be flexible, yet durable for enabling an exceptional coverage on any shaped surface and also allowing a disengagable union between the concrete and base layer once the concrete has cured properly. Due to the combination of the fibrous, non-woven base layer and the polypropylene resin protective layer, a final product is provided with the capability to lie flat on any desirable surface.

Some protective layers that are commercially available which can be used for the final composite, such as low density polyethylene, can only be secured to a non-woven, fibrous base by the use of a mechanical bond. When mechanically bonding the layers, the protective layer is typically melted partially through the base layer. This type of bonding may alter the structural integrity of each layer since the adhering method breaks the covalent bonds of the protective layer to intrinsically alter its structure. Further, since the protective layer extends into the base layer, some of the filaments are coated with the protective layer, thereby making it infeasible for moisture to adhere thereto. This will substantially reduce the water retention properties of the base. To avoid such an alloying process, a second embodiment is provided with the present invention.

The second embodiment of the present invention provides a multi-layered structure having a tie layer located between a protective layer and a base layer. This arrangement will allow proper adhesion between a non-woven base and a low-density polyethylene protective layer without sacrificing or reducing the advantages of each layer.

In this embodiment, the base is similar in structure and form as in the first embodiment, hence the base is fabricated from a non-woven, fibrous protective layer having hydrophobic characteristics. This will allow the moisture, such as water, to adhere to and be retained between the mass of entangled filaments of the fibrous protective layer. Materials which have successfully been utilized for the base have been polypropylene based polymers, preferably, but not limited to polypropylene.

The protective layer is designed to protect the base and to prevent and bar the moisture from escaping from the base. In which case, the protective layer will reduce the porosity of the fabric to air flow and prevent sun degradation by having the capabilities to be a carrier for ultraviolet ray inhibitors. One such protective layer which has been proven to work efficiently is low-density polyethylene. Unfortunately, low-density polyethylene is known for its inability to adhere properly to a non-woven fabric substrate.

Allowing proper adhesion, a resin or tie layer, which is compatible to both the polypropylene fabric and low-density polyethylene, is sandwiched between the base and the protective layer. Preferably, the low-density polyethylene and tie layer are co-extruded to the protective layer. This will allow for the protective layer to be properly secured to the base. A tie layer or resin which has been used to produce favorable results is, but is not limited to, ethylene-methyl acrylate polymer.

Hence, the final product of the second embodiment is a flexible and durable multi-layered composite possessing the ability to lay flat and co-planar to any surface. Thus, providing a product that can easily and efficiently be used on any surface, such as, but not limited to bridges, docks, highways viaducts, spillways, building construction and military installations. The final wet cure concrete cover of the second embodiment comprises a base layer, preferably fabricated from a non-woven polypropylene fabric and a co-extrusion consisting of a tie layer, preferably fabricated from ethylene-methyl acrylate polymer and a protective layer, preferably fabricated from low-density polyethylene. In use, the base layer will contact the curing concrete and will be saturated with moisture for providing the moisture, such as water, to adhere to its filaments. The protective layer will protect the base layer. The tie layer properly alloys the protective layer to the base layer without sacrificing the structural integrity of each layer. Thereby, the tie layer renders a means of securing a non-woven fabric to a low-density polyethylene.

This composite, like the first embodiment, can be of any proportion to standard roll sizes as defined in the first embodiment. Further, the size of the base and protective layers are similar in design and structure as discussed for the first embodiment and the thickness of the tie layer is of a sufficient size to impart proper adhesion between the two layers.

For protecting the composite of the first embodiment and/or second embodiment from sunlight degradation or the like, conventional additives, such as ultraviolet inhibitors, can be added to the protective layer, via conventional methods, such as injection during the transition stage. Additionally, for reflecting the sun, a high concentration of pigment can be added to this layer, such as to the upper surface, for producing a final product which will reflect both heat and sunlight. One color which has been used is white while titanium oxide has been used for the inhibitor. Thereby, the protective layer is used not only as a physical protection means, but also as a carrier for other materials.

The reflecting pigment and inhibitors used for the composite defined in the first and second embodiments of the present invention can be costly, and as such, the process for producing the wet cure cover is carefully executed.

Using conventional extruding methods, the protective layer can be co-extruded to provide for a first protective layer and a second protective layer. Combined, the first protective layer and second protective layer will have the appropriate thickness for the final composite. In this configuration, the inhibitors and/or color pigments can be added to a single layer or the upper most layer of the co-extruded protective layer, consequently reducing the final cost substantially. Therefore, it is seen that the final product can include a multi-layered protective layer which when adhered to each other will have the desired thickness for the protective layer.

Even with the use of an effective concrete curing blanket, such as the ones described in the first and second embodiments, dependent on prevailing weather, temperature and humidity conditions, it is necessary to rewet the blanket to restore moisture lost to evaporation (dehydration of the concrete surface). This involves added time and labor to remove and turn over the cover, rewetting the fibrous non-woven surface, then replacing the cover.

Under conditions of high temperature, low humidity, it would be advantageous to eliminate the necessity to take these labor intensive and time consuming measures. As such, the first and second embodiments defined above can be altered to provided for the protective layer to include a plurality of micro-perforations. These micro-perforations can be applied to the protective layer via conventional means.

By providing micro-perforations on the protective layer of each embodiment will allow for periodic water spraying or rewetting of the curing cover without the considerable time and labor involved in removing and replacing the cover. Further by "ponding" water on the covered concrete surface there is a continual reservoir of water available for continuous rewetting of the concrete surface. The precise, and very uniform, micro-perforations provide a constant evenly distributed supply of water for uniformity of strength values over the entire surface. The size of the micro-perforations being of sufficient dimensions to exceed the surface tensions of the poured surface as necessary for liquid moisture to migrate into the fibrous base non-woven layer.

EXAMPLE

The following example is a typical product which has been utilized to produce favorable and successful results.

| Layer | Material | Thickness |
| --- | --- | --- |
| Base | Non-Woven Polypropylene fabric | 50 mil |
| Protective layer | polypropylene | 4 mil |

The high-density protective layer was co-extruded to provide for a first protective layer having a thickness of 2 mil and a second protective layer having a thickness of 2 mil. The first protective layer included white reflective pigmentation and ultraviolet ray inhibitors. The combined protective layer was extruded onto the base to provide for a thermal bond to exist between the base layer and the second protective layer. The base of the composite was placed on wet concrete to render the first protective layer to be exposed to the weather elements. The composite was tested in a plurality of vertical and horizontal positions. The following observations were retained:

| Property | Value |
| --- | --- |
| Grab Tensile Strength | 100 lbs. |
| Ultraviolet Resistance | 70% strength after 150 hours of exposure |
| Light Reflectance | + 70% |
| Water Retention as a percentage of total basis weight after wetting to saturation | Vertical - 112% of dry Weight<br>Horizontal - 276% of dry Weight |
| Water retention states as a total weight after wetting to saturation | Dry Weight - (Before Wetting) 12.14 lbs.<br>Wet Weight - Vertical Drip 34 lbs.<br>- Horizontal Drip 82 lbs. |

The product performs exceptionally well and provides a light weight and easy to use curing blanket which has a substantially high moisture retention, which is desirable during the curing of the concrete.

While the invention has been particularly shown and described with reference to an embodiment thereof, it will be understood by those skilled in the art that various changes in form and detail may be made without departing from the spirit and scope of the invention.

I claim:

1. A wet curing cover comprising:
   a base layer having a top surface and a lower surface; said base layer being extruded onto said top surface of said base layer to firmly secure said protective layer to said base layer;
   said protective layer being a polypropylene material; said base layer and said protective layer each are of a significant thickness to provide for an adequate final product which is flexible, durable, transportable, and reusable said protective layer being micro-perforated to provide a plurality of micro-perforations generally uniformly spaced throughout said protective layer to permit liquid water therethrough into said base layer.

2. A wet curing cover as in claim 1 wherein said base is fabricated from non-woven polypropylene fabric.

3. A wet curing cover as in claim 1 wherein said protective layer has a thickness of about 4 mil.

4. A wet curing cover as in claim 1 wherein said protective layer includes ultraviolet ray inhibitors.

5. A wet curing cover as in claim 1 wherein said protective layer includes a reflective pigment.

6. A wet curing cover as in claim 1 wherein said base is fabricated from non-woven polypropylene fabric, said base has a thickness of about 50 mil, said protective layer has a thickness of about 4 mil, and said protective layer includes ultraviolet ray inhibitors.

7. A wet curing cover as in claim 1 wherein said base is fabricated from non-woven polypropylene fabric and said protective layer has a thickness of about 4 mil.

8. A wet curing cover comprising:
   a base layer having a top surface and a lower surface; said base layer being a non-woven, hydrophobic filament fabric;
   a co-extrusion consisting of a tie layer and a protective layer;
   said protective layer being a low-density polypropylene material; and
   said base layer and said co-extrusion each are of a significant thickness to provide for an adequate final product which is flexible, durable, transportable, and reusable said co-extrusion being micro-perforated to provide a plurality of micro-perforations generally uniformly spaced throughout said co-extrusion to permit liquid water therethrough into said base layer.

9. A wet curing cover as in claim 8 wherein said base is fabricated from non-woven polypropylene fabric.

10. A wet curing cover as in claim 8 wherein said protective layer has a thickness of about 4 mil.

11. A wet curing cover as in claim 8 wherein said protective layer includes ultraviolet ray inhibitors.

12. A wet curing cover as in claim 8 wherein said protective layer includes a reflective pigment.

13. A wet curing cover as in claim 8 wherein said tie layer is ethylene-methyl acrylate polymer.

14. A wet curing cover as in claim 8 wherein said base layer is fabricated from non-woven polypropylene fabric, said base layer having a thickness of about 50 mil, said protective layer having a thickness of about 4 mil.

15. A wet curing cover as in claim 14 wherein said protective layer includes ultraviolet ray inhibitors, and said protective layer further includes a sun reflective pigmentation.

16. A wet curing cover as in claim 10 wherein said base is fabricated from non-woven polypropylene fabric.

* * * * *